Oct. 2, 1945.   R. J. HURLEY   2,386,164
PRESSURE RESPONSIVE CONTROL INSTRUMENT
Filed Sept. 21, 1943
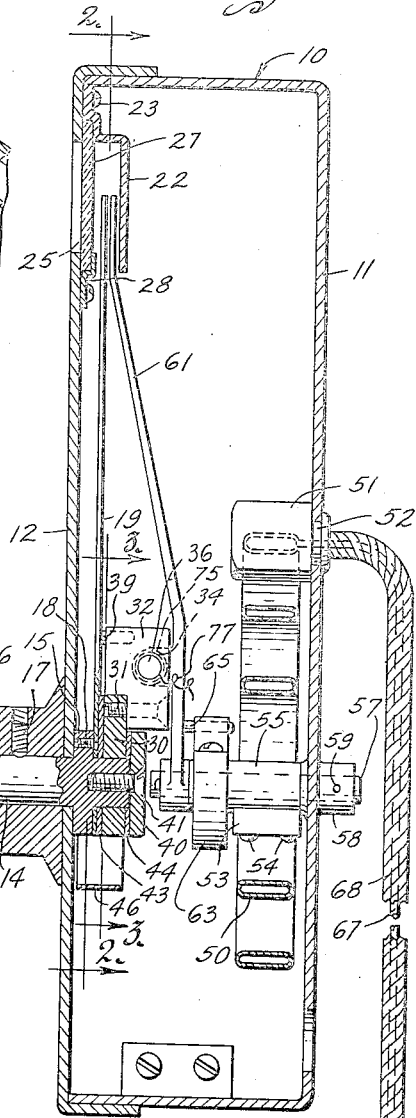
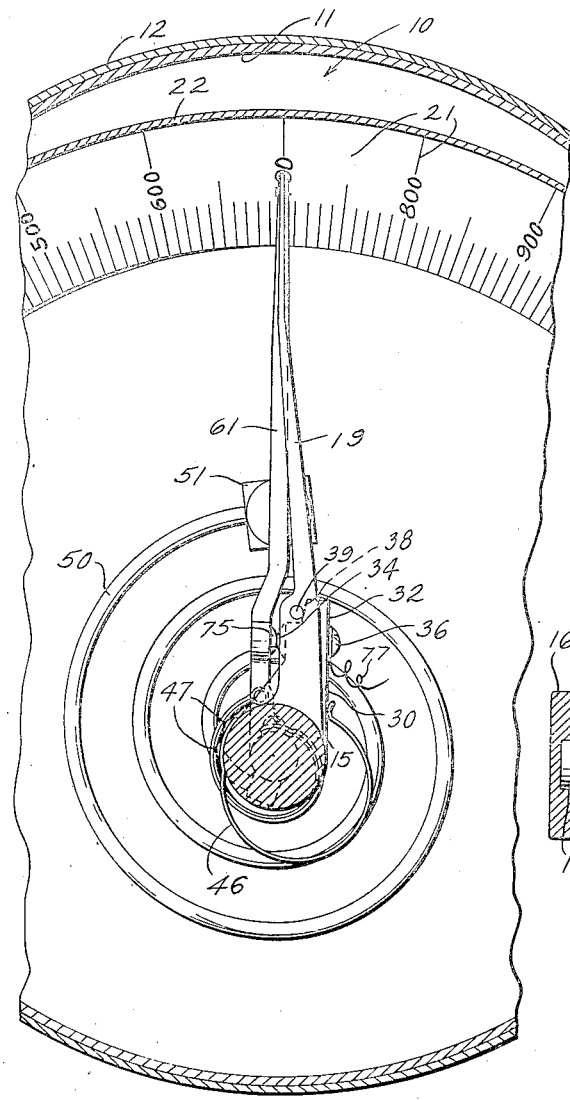
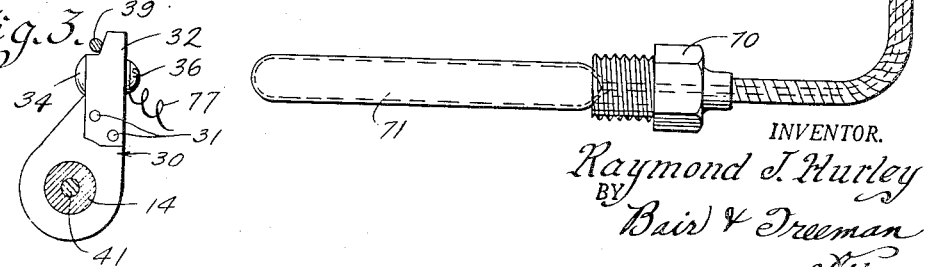
INVENTOR.
Raymond J. Hurley
BY Bair & Freeman
Attys Patented Oct. 2, 1945

2,386,164

UNITED STATES PATENT OFFICE 2,386,164

PRESSURE RESPONSIVE CONTROL INSTRUMENT

Raymond J. Hurley, Kenilworth, Ill., assignor to Hurley Electronic Controls Inc., Chicago, Ill., a corporation of Illinois Application September 21, 1943, Serial No. 503,213

2 Claims. (Cl. 200—56)

This invention relates to control instruments of the pressure responsive type. Such instruments are adapted for use in controlling various types of apparatus for maintaining a desired fluid pressure or temperature. For example, such control instruments may be employed in power plant installations for controlling the damper mechanism so as to maintain a predetermined stack temperature, or the instrument may serve to control the feeding of fuel so as to maintain a predetermined bonnet temperature, or the instrument may be utilized for maintaining predetermined temperatures or pressures of steam or water in the system. It will be apparent, however, that such control instruments are adapted to a relatively wide field of use, in connection with various industrial and commercial applications.

More particularly, the present invention is adapted to be connected in an electrical control circuit wherein there is employed a pair of separately actuated electric motors or electro-magnets, operably connected to apparatus for creating or supplying fluid of a predetermined pressure or temperature, and wherein relatively exact values of pressures and temperatures are to be maintained.

One of the objects of this invention is to provide a novel control instrument of the character indicated by virtue of which the pressure or temperature of the fluid to be controlled is caused to be maintained at an extremely accurate value.

Another object is to provide a novel control instrument of the character indicated wherein manually adjustable means, including an indicator arm, may be positioned at a predetermined value, together with means, responsive to pressure or temperature, coacting with the manually adjustable means and connected in an electrical control circuit for maintaining the pressure or temperature of the fluid at the exact value corresponding to the position of adjustment of the manually adjustable means.

A further object is to provide an improved control instrument of the character indicated which is extremely sensitive and which is instantly responsive to relatively slight changes in pressures or temperatures of the fluid being controlled.

Still another object is to provide a novel control instrument of the character indicated, characterized by the provision of manually adjustable means including an indicating arm adapted to be positioned at a predetermined value, together with means responsive to pressure, coacting with the manually adjustable means and connected in an electrical control circuit for maintaining exact pressure or temperature of the fluid being controlled in correspondence with the position of adjustment of the manually adjusting means, and wherein the adjustable means and the pressure responsive means are mechanically independent of each other.

A still further object is to provide a novel and improved control instrument of the character indicated which is relatively simple in construction, durable and extremely accurate in operation, and which may be economically manufactured.

Other objects and advantages of this invention will be apparent from the following description, taken in connection with the accompanying drawing, in which Figure 1 is a vertical axial section through the control instrument, embodying the present invention.

Figure 2 is a fragmentary transverse section through the instrument taken as indicated on line 2—2 of Figure 1, and Figure 3 is an elevational view of the contact carrier arm.

The control instrument embodying the present invention is adapted for use in a suitable electrical control circuit, such as of the type disclosed in the Whitenack Patent No. 2,208,235, issued July 16, 1940.

It is to be understood that the motive power actuated by the control circuit comprises two separately operable electric motors which may be of the conventional alternating current type or may be in the form of electromagnets. Such motors are preferably connected in a suitable manner to the apparatus which regulates the pressure or temperature of the fluid being controlled or may be operably connected to piloting apparatus which in turn controls main apparatus, such as for example, a pilot valve, which in turn controls a main fluid supply valve.

Referring now in detail to the drawing, the instrument includes a support in the form of a housing 10 comprising a sheet metal, cup-shaped back member 11, and a cooperating sheet metal cup-shaped front member 12 telescopically connected to the back member 11, as seen in Figure 1. The upright walls or ends of the respective members 11 and 12 constitute supports for parts of the instrument. Journalled in the front wall constituting a part of the housing member 12 is a stub shaft 14, provided with an enlarged flange 15 adapted to abut against the inner surface of the wall. Mounted on the outer end portion of the stub shaft, exteriorly of the housing, is a finger knob 16, firmly connected to the shaft by a set screw 17. By virtue of the flange 15 and the knob 16, the stub shaft 14 is confined against any appreciable amount of axial movement. Rigidly attached to the rear face of the flange 15 of the stub shaft by means of screws 18, is an indicating arm 19, the outer end of which is formed to constitute a pointer, which overlies a graduated scale 21, formed on a curved segmental member 22, secured by screws 23 to the inner surface of the end wall of the housing member 12. The graduations of the scale are arranged concentrically with the axis of the indicator arm. An arcuate opening 25 is formed in the end wall of the housing member 12, in registration with the scale 21. Disposed in registration with the opening 25, and in overlapping relation to the graduated scale 21, is a transparent panel 27, such as glass, which is secured in position at its upper edge by an offset portion of the member 22, upon which the graduated scale is formed. The panel 27 is supported at its lower edge by clips indicated at 28, secured to the inner surface of the end wall of the housing member 12. By virtue of this construction, rotation of the knob 16 causes the indicator arm 19 to be rotated therewith as a unit, so that its outer end may be adjusted to a position in registration with a predetermined graduation of the scale.

Freely mounted on the inner end of the stub shaft 14 is a contact carrier arm 30, secured to the upper end of which, by means of screws 31, is a block of insulating material as indicated at 32. Mounted in the insulating block, as may be seen in Figure 3 of the drawing, is a contact 34, preferably of silver, attached to a stud 35 which in turn is held in fixed relation in the block 32 by a screw 36. The upper end of the block 32 is formed with an inclined shoulder constituting an abutment 38 which is adapted to cooperate with an abutment 39, in the form of a pin, rigidly secured to and projecting rearwardly from the manually adjustable indicating arm 19.

The carrier arm is confined in position on the inner end of the stub shaft by a member 40, and a screw 41, threaded into the end of said shaft as clearly seen in Figure 1 of the drawing. To insure minimum of friction in the movement of the carrier arm on the stub shaft, washers 43 and 44 are disposed against opposite faces of the carrier arm. Said carrier arm is yieldingly urged in a direction to normally maintain the abutment 38 thereof in engagement with the abutment pin 39 on the manually adjustable indicating arm. For this purpose I provide a curved leaf spring 46, rigidly secured at one end by screws 47 to the periphery of the flange 15 which is an integral part of the stub shaft 14. The free end of the spring 46 is adapted to engage an edge of the arm 30, so as to exert a yielding force, in a direction so as to cause its abutment 38 to engage the abutment pin 39 as above stated, and as clearly seen in Figure 2.

Mounted on the inner surface of the end wall of the housing member 11, is a spirally formed Bourdon tube 50, the outer end thereof being anchored in a fixture 51, rigidly attached to said wall of the housing member 11, in any conventional manner and, as herein shown, by a flanged grommet 52. The inner end of the spiral Bourdon tube is sealed and rigidly connected to a block 53, secured by screws 54 to a hub 55, journalled on a stub shaft 57. Said stub shaft 57 is supported in a boss 58, which is rigidly secured, as by welding, to the outer surface of the end wall of housing member 11. The stub shaft is rigidly connected to the boss 58, by means of a pin 59.

Journalled on the inner end of the stub shaft 57 is a pressure responsive indicating arm 61. Said arm may be if desired directly connected to the hub 55. However, it is preferred that the connection between said arm 61 and the spiral tube 50 be in the form of an ambient temperature compensating device. Said compensating device as indicated at 63 in the drawing, preferably comprises a bi-metallic strip of spiral form, having the inner end thereof rigidly attached to the hub 55, and the outer end thereof connected to a pin 65 which is connected to and extends rearwardly from the pressure responsive indicating arm 61 which pin as seen in the drawing is disposed a short distance from the axis of rotation of said arm.

The ambient temperature compensating device functions to constantly correlate the relationship of the indicator arm 61 with respect to the Bourdon tube 50, throughout a normal range of ambient temperatures, so that the arm 61 will directly and accurately indicate an exact temperature or pressure condition in response to the position assumed by the Bourdon tube, irrespective of change in ambient temperature.

The fixture 51 of the Bourdon tube is connected by a capillary tube 67, which is preferably enclosed in a sheath 68 of heat insulating material. When the instrument is to be used for maintaining or controlling temperatures, the free end of the capillary tube is connected through a fixture 70 in open communication with an enlarged chamber of a sensitive temperature responsive element 71, of a conventional type, such as shown in the drawing, and the threaded portion of the fixture 70 is adapted to be threaded into a suitable taped opening into a chamber or conduit in which the sensitive element 71 is to be projected in a manner well understood in the art.

When the instrument is to be used for maintaining pressures, the free end of the capillary tube 67 is then exposed directly to the fluid pressure which the instrument is to control.

The outer end of the pressure responsive indicating arm 61 is also dimensioned as to overlie the graduations of the scale 21, with its terminal indicating portion disposed rearwardly of the terminal indicating portion of the manually adjustable indicating arm 19, as seen in Figure 1 of the drawing.

Adapted for cooperation with the contact 34 on the carrier arm 30, is a contact 75, preferably of silver, carried by the pressure responsive indicating arm 61. The contacts are adapted to be connected in an electrical control circuit as above referred to and for which purpose the contact 75 is grounded through the arm 61, stub shaft 57 and the housing member 11. The other cooperating contact 34 is connected by conductor wires, as indicated at 77, to a terminal in the electrical control circuit.

The function of the control device is identical when used in controlling either pressures or temperatures, except that in one instance, the capillary tube is open in direct communication to the fluid, the pressure of which is to be controlled, and in the other instance, the capillary tube is connected to a sensitive temperature responsive element such as indicated at 71, adapted to be extended into the fluid, the temperature of which is to be controlled.

To operate the instrument, the hand knob 16 is manually rotated to adjust the indicating arm 19 in alignment with a predetermined graduation of the scale 21, corresponding to the temperature or the pressure that is desired to be maintained. When the device is connected in an electronic control circuit, such as disclosed in the above-mentioned Patent No. 2,208,235, one of the motors is actuated to operate other apparatus, such as a valve, fuel feeding mechanism, etc., which will vary the pressure acting through the capillary tube and the spiral Bourdon tube 50, for causing the pressure responsive arm 61 to move to a position in exact alignment with the manually adjustable indicating arm 19. As said arms 61 and 19 approach such alignment the contact 75 will engage contact 34, and by virtue of which the branch of the electronic control circuit heretofore functioning for varying the fluid pressure or temperature, becomes inoperative and another branch electrical circuit is completed to energize the other motor, which will result in reversing the direction of operation of said other apparatus for oppositely varying the pressure or temperature in the fluid system being controlled. Such reversal will cause the contacts 75 and 34 to again separate, and the branch electrical circuits are again reversed. It will therefore be apparent that when the arms 61 and 19 come into a position of alignment, the contact buttons 75 and 34 rapidly and continuously make and break as long as the conditions of fluid pressure or temperature remain constant. Just as soon as there is an extremely slight drop or increase in the pressure or temperature of the fluid being controlled the Bourdon tube instantly reacts, causing corresponding movement of the arm 61 to dispose its contact 75 out of or into engagement with contact 34. Such action immediately and alternately renders operative two branches of the control circuit, to energize the respective motors, by virtue of which the main source of energy effecting the pressure or temperature of the fluid being controlled is correspondingly adjusted to maintain exact temperature or pressure control.

After the indicator arms 61 and 19 come into alignment, they are maintained in relatively exact alignment because the range of movement of contact 75 relatively to contact 34 will be so small as to be practically incapable of measurement. Such slight movement is possible because the branch circuits into which said contacts are connected carry an extremely small amount of electrical potential.

By virtue of the construction of control device constituting the present invention, the pressure or temperature of a fluid may be continuously maintained at an extremely exact value in correspondence to the predetermined value originally desired, and as represented by the position of adjustment by the manually adjustable indicator arm 19 with respect to the graduated scale 21. By maintaining such exact values of fluid pressures and temperatures there results great economies in operation of various types of apparatus, such as, for example, savings in fuel in operating power plant equipment.

The terms "pressure responsive" and "pressure actuated" as used herein and in the claims is intended to be construed as such scope as applied to control instruments that are used either for controlling temperatures or pressures of fluids.

Although I have shown herein and described certain preferred embodiments of my invention, manifestly it is capable of further modification and re-arrangement of parts, without departing from the spirit and scope thereof. I do not, therefore, wish to be understood as limiting this invention to the precise forms herein disclosed, except as it may be so limited in the appended claims.

I claim as my invention:

1. A control instrument comprising a support, a graduated scale, rotatable means comprising a manually adjustable indicator arm adapted to be aligned with a predetermined graduation of the scale, a spirally formed Bourdon tube having its outer end fixedly mounted, a pivotally mounted pressure responsive indicator arm adapted to register with graduations of the scale, an ambient temperature compensating device operably connecting the inner end of said tube and said pressure responsive indicator arm, whereby said last mentioned arm is moved about its pivotal mounting incident to movement of the inner end of the tube, caused by change in pressure in said tube, and a pair of cooperating electrical contacts carried on said rotatable means and pressure responsive indicator arm.

2. A control instrument comprising a support having a front and a rear panel, a graduated scale, a stud journalled in the front panel, a knob on the outer end of the stud disposed externally of the panel, an indicator arm fixedly mounted on the opposite end of the stud rearwardly of the front panel and adapted upon rotation of the knob to be disposed in registration with a selected graduation of the scale, a carrier arm journalled on the stud adjacent said indicator arm, said arms having cooperating abutments for limiting rotation of one arm relatively to the other, spring means acting on the carrier arm for normally maintaining it in a position with its abutment in engagement with the abutment on the indicator arm, a spirally formed Bourdon tube having its outer end fixedly secured to the rear panel, a tubular member connected to the inner end of the tube, a stud extending through said member and supported by the rear panel, a pressure responsive indicator arm mounted on said last mentioned stud for pivotal movement and adapted to have its outer end register with the graduations of the scale, an ambient temperature compensating device for connecting the inner end of the tube to said pressure responsive indicator arm at a point remote from its axis, and a pair of cooperating electrical contacts carried respectively on said carrier arm and said pressure responsive indicator arm and adapted to be connnected in an electronic circuit.

RAYMOND J. HURLEY.